United States Patent [19]
Arand et al.

[11] Patent Number: 5,393,413
[45] Date of Patent: Feb. 28, 1995

[54] METHOD FOR CATALYTIC LOW TEMPERATURE AND PRESSURE REFORMING OF LIGHT HYDROCARBON FUELS FOR SELECTIVE PRODUCTION OF AROMATICS, OLEFINS AND SATURATES

[75] Inventors: Anthony J. Arand, Escondido; John K. Arand, Jr., Rancho Palos Verdes, both of Calif.

[73] Assignee: Pac Rim Products, Inc., Escondido, Calif.

[21] Appl. No.: 941,408

[22] Filed: Sep. 8, 1992

[51] Int. Cl.$^6$ ............................................. C10G 35/04
[52] U.S. Cl. ................................... 208/134; 208/137; 208/138
[58] Field of Search ................................. 208/134, 138

[56] References Cited

U.S. PATENT DOCUMENTS

| | | | |
|---|---|---|---|
| 2,308,774 | 1/1943 | Oblad et al. | 208/134 |
| 3,617,518 | 11/1971 | Sinfelt et al. | 208/138 |
| 4,198,536 | 4/1980 | Aliev et al. | 585/626 |
| 4,263,133 | 4/1981 | Drehman et al. | 208/134 |
| 4,342,643 | 8/1982 | Kyan | 208/134 |
| 5,013,426 | 5/1991 | Dang vu et al. | 208/134 |
| 5,252,197 | 10/1993 | Alexander et al. | 208/134 |

Primary Examiner—David B. Springer
Attorney, Agent, or Firm—Blakely, Sokoloff Taylor, Zafman

[57] ABSTRACT

A stationary or mobile process for the selective production of aromatics, olefins and saturates from commercially available light hydrocarbon fuels using a low temperature and pressure catalytic system is described. The reforming of these products occur when the hydrocarbon fuel is passed over a dissimilar metal catalyst, preferably containing nickel and copper at low temperature (i.e., about $-50°$ F. to 250° F.) and pressure (i.e., about 10 to 100 psia). The dissimilar metal catalyst is housed in a non-electrical conducting chamber and is operated with fluid Reynolds Numbers over the catalyst surface of between $2 \times 10^3$ and $20 \times 10^4$. The hydrocarbon fuel is recirculated, by means of a constant speed pump, over the dissimilar metal catalyst between 1 and approximately 100 times. This process results in reformed hydrocarbon fuels having superior performance qualities than the base hydrocarbon fuel. Vehicle road tests using such reformed fuels have shown substantial mileage improvements over the base fuels.

13 Claims, 5 Drawing Sheets

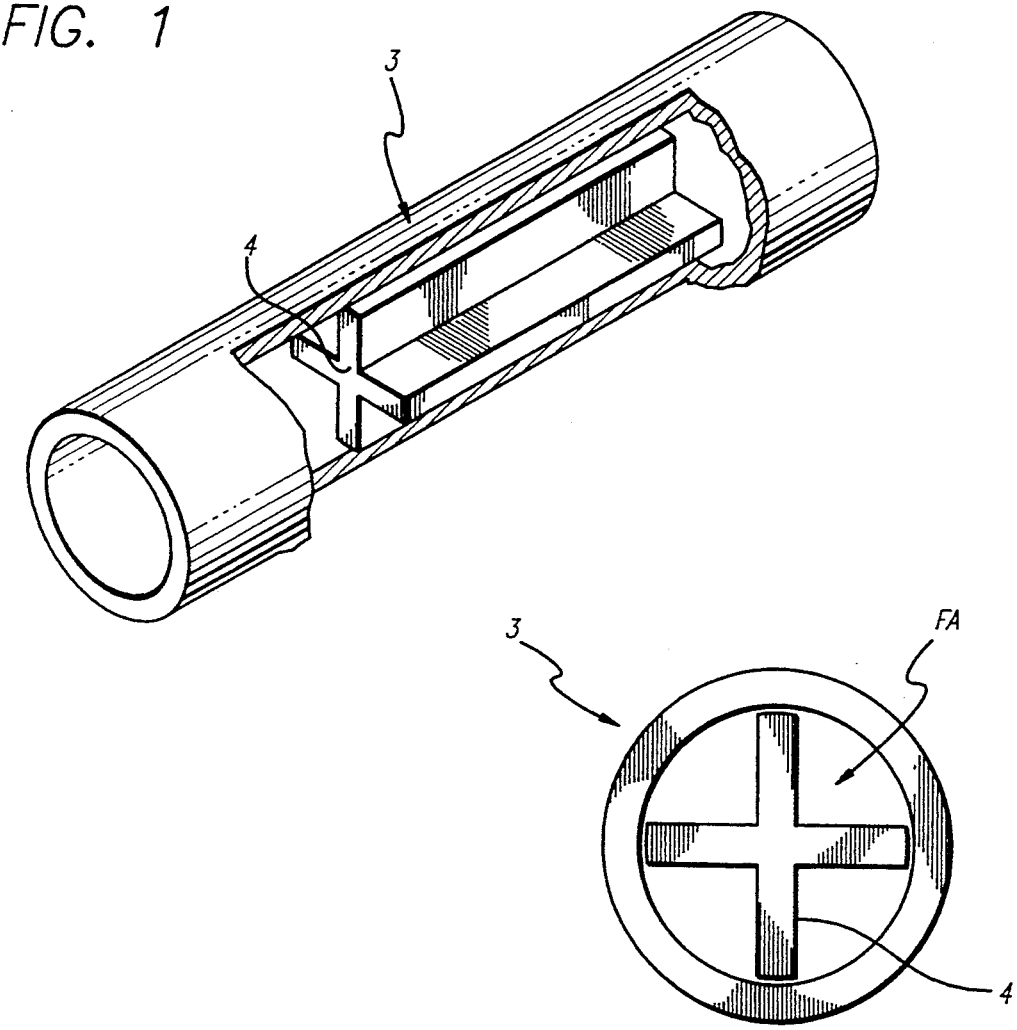
FIG. 1
FIG. 2
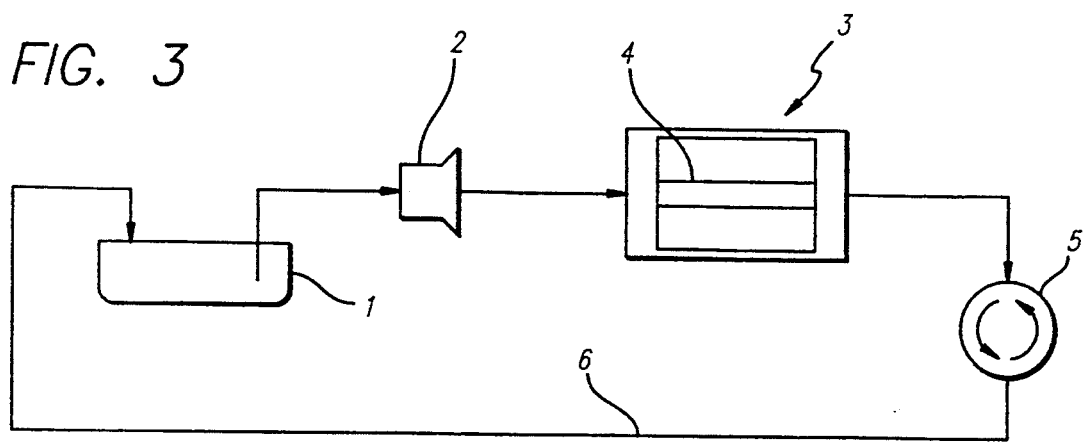
FIG. 3

METHOD FOR CATALYTIC LOW TEMPERATURE AND PRESSURE REFORMING OF LIGHT HYDROCARBON FUELS FOR SELECTIVE PRODUCTION OF AROMATICS, OLEFINS AND SATURATES

BACKGROUND OF THE INVENTION

1. Field of the Invention

The present invention relates to an apparatus utilizing certain metal catalysts for improving fuel economy in gasoline and diesel powered equipment, and the methods for using the same. The invention is preferably in the form of an in-line fuel device.

2. Art Background

In recent years a number of products have been brought to the marketplace with claims of improved fuel economy and performance for ignition and compression piston engines.

Catalysts are often incorporated in such products. Dissimilar metal catalysts have been used in oil drilling operations since about 1970. Such dissimilar metal catalysts were used at the well head and minimized the build up of scale and other deposits on the walls of the well head.

Several manufacturers have recently placed in line catalytic products on the market for improving the efficiency of gasoline and diesel engines, which products are believed to be based upon the aforementioned catalyst technology used in the oil drilling operation. There have been claims that such devices can be used on either gasoline or diesel powered vehicles. However, the use of those types of products have not been wide spread because the products currently being produced either do not work at all, or do not work consistently. A device which may show improvement on certain gasoline engines may not show an improvement on other gasoline engines or when used on a diesel engine. The converse is also true, in that a device which works on a diesel engine may not work on a gasoline engine. Few scientific investigations have been conducted to attempt to explain or understand the phenomenon of how these metal catalysts are able to produce the effect seen on the hydrocarbon fuels.

Explanations for how the products function rely mostly upon the theory that the device polarizes the fuel molecules. In some instances the location of the device must be as close as possible to the fuel introduction to the engine as it is believed that the device's effect on the fuel is temporary.

U.S. Pat. No. 4,959,155 discloses a method for purification of fluids such as water, aqueous fluids and fuel fluids (e.g., gasoline and diesel fuels) by using a solid body alloy in a chamber and passing the fluid to be purified over the solid body alloy and through the chamber. It is stated that such process results in the purification of the fluid and in the case of fuels for internal combustion engines the polluting emissions are reduced because of better combustion and that maintenance costs are lowered. However, this patent does not deal with the effects obtained under certain Reynolds Number conditions nor the unexpected results achieved by recirculation of the fuels as explained in greater detail hereinbelow.

None of the in-line catalysts products of which the applicants are aware produce consistent results in fuel economies of performance on either gasoline or diesel fuels.

Petroleum based fuels are the primary fuels used for automobiles, stationary and mobile diesel powered equipment, jet engines and a wide variety of stationary devices. These lightweight fuels, including gasoline, diesel and kerosene fuels, are composed of blends of refinery stocks. All have three basic hydrocarbon types, namely, saturates (naphthenes and paraffins), olefin and aromatics. Typical mass fractions of these hydrocarbons found in these fuels are given in Table 1.

TABLE 1

| PROXIMATE ANALYSIS OF LIGHT LIQUID FUELS[1] | | | | | | | | |
|---|---|---|---|---|---|---|---|---|
| | % MASS | | | | | | | |
| | GASOLINES | | KEROSENES | | | DIESELS | | |
| | iso octane | 100/300 octane | 80 octane | Wide cut | Aviation | High Flash Point | Gas oil | Med |
| AROMATICS | 0 | 13.5 | 14 | 20.5 | 7.5 | 22 | 24 | 16 |
| OLEFINS | 0 | 0.5 | 28 | 1.5 | 0.5 | 0.5 | 3.5 | 8 |
| NAPHTHENES | 0 | 14 | 14 | 23 | 29 | 39 | 31 | 28 |
| PARAFFINS | 100 | 72 | 44 | 55 | 63 | 38.5 | 41.5 | 48 |

[1]Gas Turbine Fuels And Their Influence on Combustion J. Odgers And D. Kretschmer, Abacus Press 1986

The percentage of these three hydrocarbon types present in each of the three fuels determine the performance characteristics of these fuels in the respective power generating equipment employing these fuels. For instance, high aromatic content in the fuels used in gas turbines and diesel engines tend to result in smoke emissions and carbon formation in the exhaust gases from these devices, whereas in gasolines, the slow burning aromatics can act to reduce the knocking tendencies of gasoline. In the refining of these fuels catalytic cracking at high temperatures and pressures can be employed to produce the three hydrocarbon types found in these fuels.

None of the prior art, of which applicants are aware, teaches effective and consistent methods to control emissions with the in-line devices on gasoline or diesel engines. Nor does the prior art define the parameters essential to achieving a successful improvement in fuel economy when such a device is installed on a vehicle. The present invention is based upon the chemical changes of the fuels over a wide range of fuel flow, Reynolds Numbers, catalyst composition, catalyst configuration, fuel composition, location of the catalyst in the system and system configurations.

The present invention defines the operating parameters and apparatus essential to achieving increased fuel economy and reduced exhaust emissions on diesel and gasoline engines when a copper/nickel catalyst is utilized with light hydrocarbon fuels.

In the process of the present invention, low temperature reforming using dissimilar metal catalysts is utilized to improve the available fuels by changing the relationship, percentage, of each type of hydrocarbon present in the fuels.

SUMMARY OF THE INVENTION

The present invention is directed to an apparatus and method for improving the efficiency of a hydrocarbon-powered engine. A number of dissimilar metal catalysts have been evaluated. The exact mechanism which allow these catalysts to alter the hydrocarbon fuel structure is not totally understood at the present time. However under the correct conditions, as defined herein, catalysts which are known to be used to ionize water can be used in the present invention to alter the hydrocarbon fuel structure and thereby improve the characteristics of the engine to which the catalyst system is connected.

All of these catalysts useful in the present invention contain a basic copper/nickel alloy with varying amounts of the elements of zinc, tin, iron, manganese and lead. The present invention is not directed to an optimum composition for the catalyst to achieve the maximum performance with hydrocarbon fuels. Catalyst compositions in the range of the values given in Table 2 will allow the invented methods and apparatus to function and to improve the efficiency of the engine. The actual performance of the engine will depend upon the composition of the particular catalyst composition employed, the starting composition of the hydrocarbon fuel and the other factors discussed below.

Without being bound by any particular theory of operation, the copper/nickel alloy apparently acts as a fuel cell and an ionic exchange occurs between the hydrocarbon compounds as a result of an electrical current generated either by the copper/nickel alloy or by static electricity build up due to the high mass flow of the hydrocarbon fuel in a nonelectrically grounded line. There has not been any observed loss of mass of the catalyst in this process in any experiments to date.

The presently invented process achieves the selective production of aromatics, olefins and saturates from commercially available fuels using a relatively low temperature and pressure catalytic system. The reforming of these hydrocarbon fuel products occurs when a hydrocarbon fuel is passed over the type of dissimilar metal catalysts disclosed herein at temperatures of about −50° F. to 250° F. and pressures of about 10 psia to 100 psia.

It is further believed that when light hydrocarbon blends of fuels are flowed over the surface of copper/nickel catalysts of the present invention, an ionic exchange occurs which acts to break the bonds of the various compounds in the fuel and to form other compounds.

The degree of reforming and the specific products being formed is a function of the chemical composition of the catalyst, the composition of the hydrocarbon fuel, the Reynolds Number of the fluid flowing in the line at the catalyst, the number of exposures of the total mass of fuel involved to the catalyst and the temperature of the fuel (fluid). The temperature of the fuel affects the Reynolds Number and the reaction rate of the process. In order to be effective the metal catalyst must be electrically isolated from any possible grounding which could occur in the installation of the catalyst, and the catalyst is thus provided in a non-conducting housing. Preferably, the catalyst is mounted in a neoprene or similar type chamber for proper function. Additionally, a non-condunctng or a non-electrically conducting chamber may include a metal or other electrically-conducting chamber which is electrically isolated from an electrical source or ground.

BRIEF DESCRIPTION OF THE DRAWINGS

FIG. 1 illustrates a typical catalyst installed in a typical non-electrical conducting housing which is basically a constant diameter tube.

FIG. 2 is a cross-sectional view of the configuration depicted in FIG. 1.

FIG. 3 is a schematic of a typical in-line fuel treatment system.

DETAILED DESCRIPTION OF THE INVENTION

REYNOLDS NUMBER CALCULATIONS

Figure 4A:
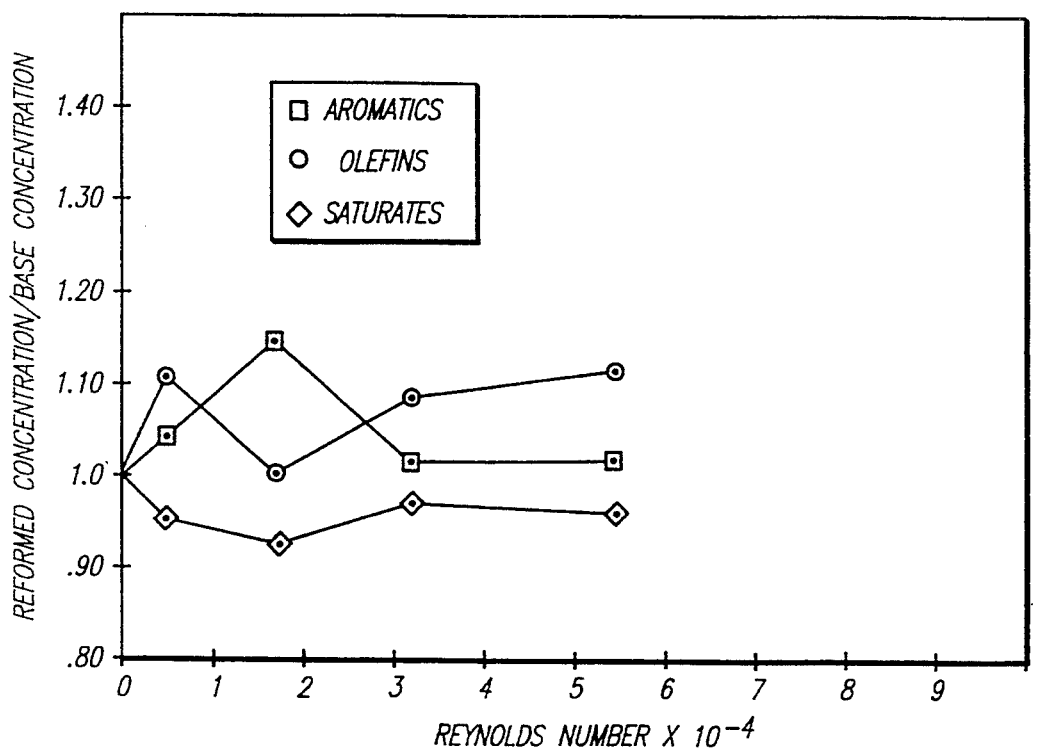
FIG. 4a is a graph which illustrates what occurs for a typical gasoline when a single pass over a typical catalyst is made for various Reynolds Numbers in the process.

FIG. 1 illustrates a typical catalyst 4 installed in a typical non-electrical conducting housing 3 which is basically a constant diameter tube. Reynolds Number for pipe flow is defined as follows:

Re=VD/u where:

V=Core velocity in meters/sec

D=Hydraulic Diameter in meters u=Kinematic Viscosity in meters squared per second FIG. 2 is a cross-sectional view of the configuration depicted in FIG. 1. The area FA available for fluid to pass through this assembly is defined as the flow area, and is equal to the cross-sectional area of the tube minus the cross-sectional area of the catalyst. The flow area is used to calculate an equivalent round pipe hydraulic diameter. Hydraulic diameter is defined as follows:

$$\text{Flow Area} = \frac{\pi D^2}{4}$$

or solving for hydraulic diameter D, $$D = \sqrt{4*(\text{flow area in meters}^2)/\pi}$$

Flow velocity, V, is calculated as follows:

V=cubic meters per second/flow area in square meters

Kinematics viscosity is taken from Table 1.14(z), page 14 of "Introduction to Fluid Mechanics, 2nd edition, by James E. A. John and William L. Haberman."

| | | |
|---|---|---|
| Tube cross-sectional area | = | .0005 square meters |
| Catalyst cross-sectional area | = | .0004 square meters |
| Flow rate | = | .001 cubic meters per second |
| Flow area | = | .0005 M$^2$ − .0004 M$^2$ |
| | = | .0001 M$^2$ |
| Flow velocity | | |
| V | = | (.001 M$^3$/s)/.0001 M$^2$ |
| V | = | 10 M/s |
| Hydraulic diameter | | |
| D | = | $\sqrt{4*(.0001 \text{ M}^2)/\pi}$ |
| D | = | .00012 M |
| Fluid viscosity | | |
| u | = | .000002 M$^2$/S |
| Reynolds Number | | |
| Re | = | (10) * (.00012)/.000002 |
| Re | = | 600 |

The range of the various elements in the copper/nickel catalyst alloys which have been evaluated are shown in Table 2. These are the limits of the composition of the various catalysts which are known to be effective in reforming the hydrocarbon fuels.

The chemical compositions of a typical copper/nickel catalyst and the range for several catalysts tested, all of which are effective in the present invention, are given in Table 2.

TABLE 2
METAL CATALYST COMPOSITION

| | PREFERRED CATALYST | | ALL CATALYSTS RANGE OF |
|---|---|---|---|
| ELEMENT | AS EVALUATED | LIMITS | COMPOSITION ELEMENT LIMITS |
| COPPER | 44.70% | 43–47% | 44.70–55.35% |
| TIN | 17.38 | 15–19 | 1.99–17.38 |
| LEAD | .03 | .03 MAX | .02–1.43 |
| ZINC | 9.85 | 8–12 | 9.85–26.98 |
| NICKEL | 27.83 | 26–30 | 4.00–27.83 |
| IRON | .20 | .17–.23 | .10–.29 |
| SULFUR | .008 | .01 MAX | 0.0–.008 |
| ALUMINUM | | | 0.0–.76 |
| MANGANESE | <.01 | .01 MAX | <.01–9.20 |
| | 100.008 | | |

The compositions for 3 different catalysts is provided in Table 3, with Catalyst B being the presently preferred catalyst.

TABLE 3
METAL CATALYST COMPOSITION

| ELEMENT | A | B | C |
|---|---|---|---|
| COPPER | 49.19% | 44.70% | 55.35% |
| TIN | 7.83 | 17.38 | 1.99 |
| LEAD | .02 | .03 | 1.43 |
| ZINC | 21.17 | 9.85 | 26.98 |
| NICKEL | 21.68 | 27.83 | 4.00 |
| IRON | .10 | .20 | .29 |
| SULFUR | | .008 | .005 |
| ALUMINUM | | | .76 |
| MANGANESE | .01 | <.01 | 9.20 |

In the present process, the critical aspects of the present invention are the control of the Reynolds Number of the fluid and the number of exposures of the fluid to the catalyst. Additionally the catalyst is electrically isolated. A schematic of a typical system is given on FIG. 3. In this process the hydrocarbon fuel is drawn from the source (fuel tank) 1, through a filter 2, into the isolating chamber 3 and over the catalyst 4, through a constant speed pump 5, discharged through a fuel line 6 back into the source 1.

Figure 4B:
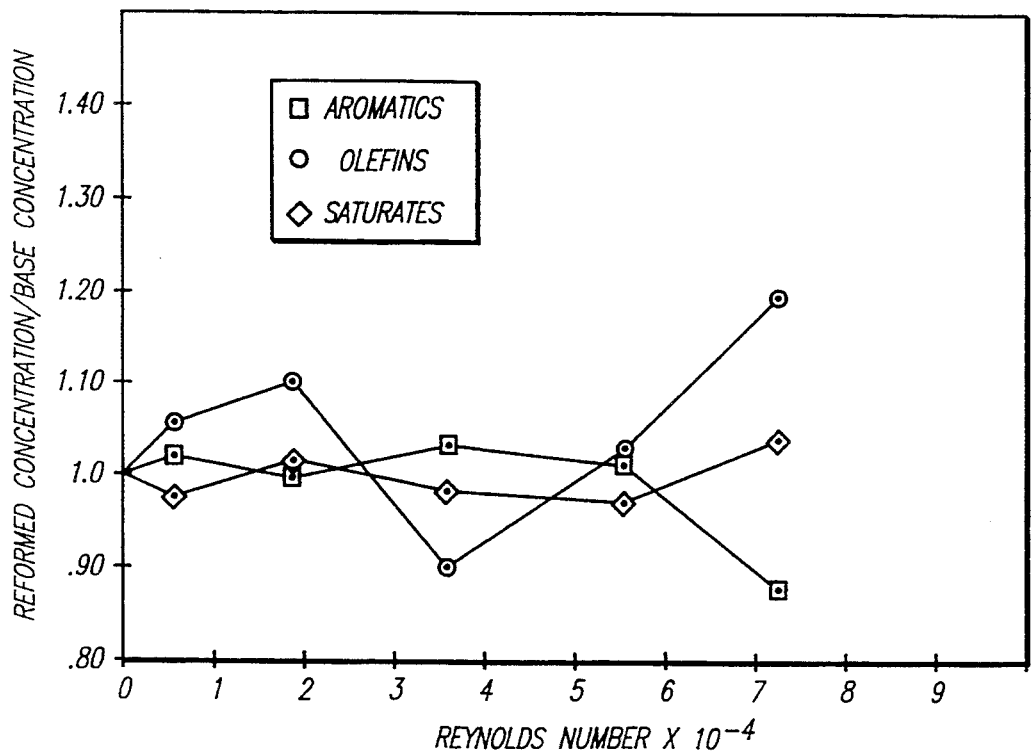
FIG. 4b is a graph which illustrates what occurs for a typical gasoline after 25 passes over a typical catalyst is made for various Reynolds Numbers in the process.
Figure 4C:
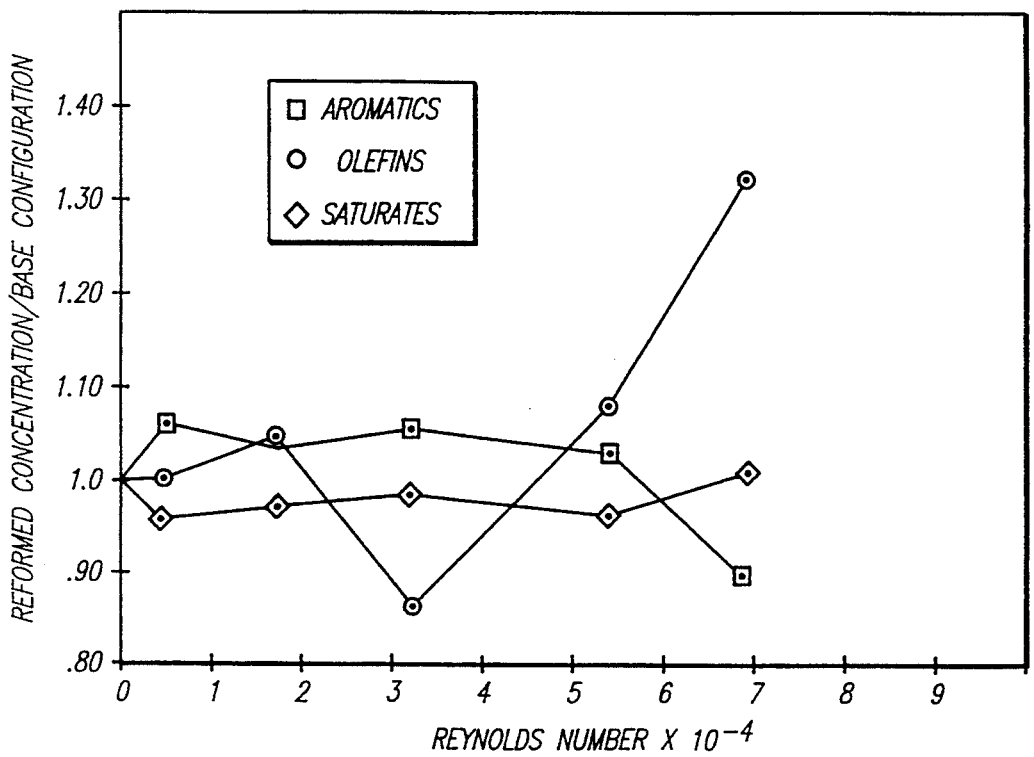
FIG. 4c is a graph which illustrates what occurs for a typical gasoline after 80 passes over a typical catalyst is made for various Reynolds Numbers in the process.

FIG. 4a illustrates what occurs for a typical gasoline when a single pass over a typical catalyst is made and FIGS. 4b and 4c illustrate what occurs with multiple passes and for various Reynolds Numbers for the process described above. The aromatic, olefin and saturate fractions of the fuel are altered at the various Reynolds Numbers. The aromatic fraction of the fuel is reduced, at certain Reynolds Numbers as the number of passes are increased, in particular at values higher than about $5 \times 10^4$ and then is seen to increase with a higher number of passes.

The inflection point where the aromatic fractions start to reverse and increase with a higher number of passes appears to be a saturation point for the saturates and the point at which reforming of the saturates occur back to other hydrocarbon forms. On FIGS. 4a–4c, the process is clearly shown to be controlled by the Reynolds Number of the fluid and number of cycles.

In the present process a method is defined for controlling the Reynolds Number of the fluid over the catalyst, the number of exposures of the fluid to the catalyst and the electrical isolation of the metal catalyst to insure that the operating conditions of the catalyst always reduces the aromatic fraction and increases the saturate or olefin fraction of the fuel.

Figure 5:
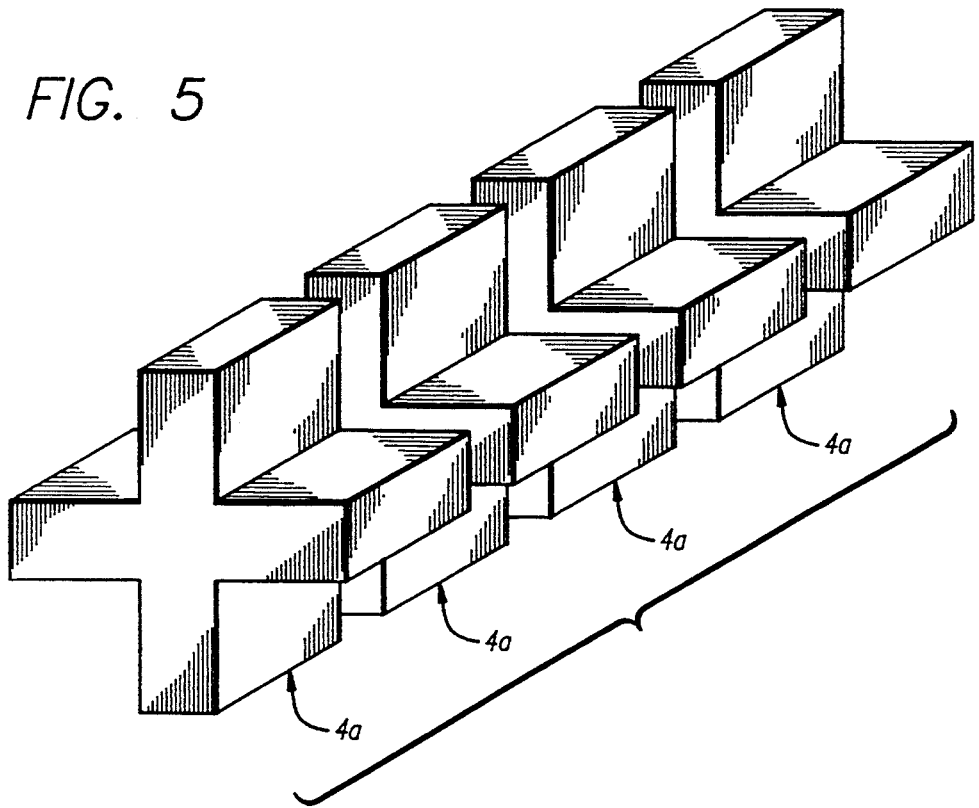
FIG. 5 illustrates a preferred catalyst configuration which simulates a packed column.

A preferred catalyst configuration is shown on FIG. 5. This configuration simulates a packed column. Each radial segment 4a is joined to the adjacent segment by a reduced diameter of material (not shown). The fuel (gasoline, diesel or kerosene) flows past each radial segment at the desired Reynolds Number. By tripping the flow (flow area change) after each radial segment a new cycle is started. This is equivalent to a recirculation (pass) of the fuel over the catalyst. The radial elements in alternate axial positions may be rotated up to 45° from the previous radial element to achieve even a closer simulation of a packed column. This configuration can be used where a large number of cycles are required to treat the fuel or when a limited number of passes occur such as in an in-line installation on older carburated engines.

The preferred catalyst configuration is subject to all of the previously defined criteria, such as, Reynolds Number range, electrical isolation and catalyst composition. However, when, for example, a 12 radial element catalyst is used what would have been a single pass over the catalyst becomes 12 passes. Thus it is possible with two of the preferred catalysts in series in an in-line system to produce a 24 pass system on the in-line configuration if the Reynolds Number criteria has been met.

Extensive road tests on gasoline powered vehicles have shown that when the aromatic content of the fuel is reduced, by means of low temperature and low pressure catalytic reforming, over the initial aromatic content of the (base) fuel, a substantial increase in the fuel economy of the vehicle is achieved. The improvement ranges from between 5 to over 20%. Table 4 gives road test results obtained with this process. This Table shows data sets for the two vehicles used to evaluate the prototype configuration (process). The base column is the baseline mileage for each vehicle. Each subsequent column is one data (test) point for the conditions shown. The flow rate in gallons per minute heads each column, flow rate is one of the primary parameters which influences the Reynolds Number, another being the Flow Area as shown in FIG. 2.

The number of cycles is the number of times that the fuel in the source tank was passed over the catalyst at the flow rate given. The Reynolds Number shown is the calculated value for each test point, using the procedure previously defined above. The Reynolds Number can be varied by increasing or decreasing the flow rate for a fixed catalyst geometry, which is how the data for Catalyst A was obtained, or by changing the Flow Area, which is what was done on Catalyst B under the columns MOD 1 and MOD 2.

Each column shows the mileage driven and miles per gallon obtained for the test point. The percentage increase, improvement in gas mileage, is obtained by subtracting the baseline MPG from the test MPG and expressing that value as a percentage of the baseline MPG.

| -continued | |
|---|---|
| Vehicle B | 1974 AMC Javelin 2WD; 304 CID Engine |

Figure 7:
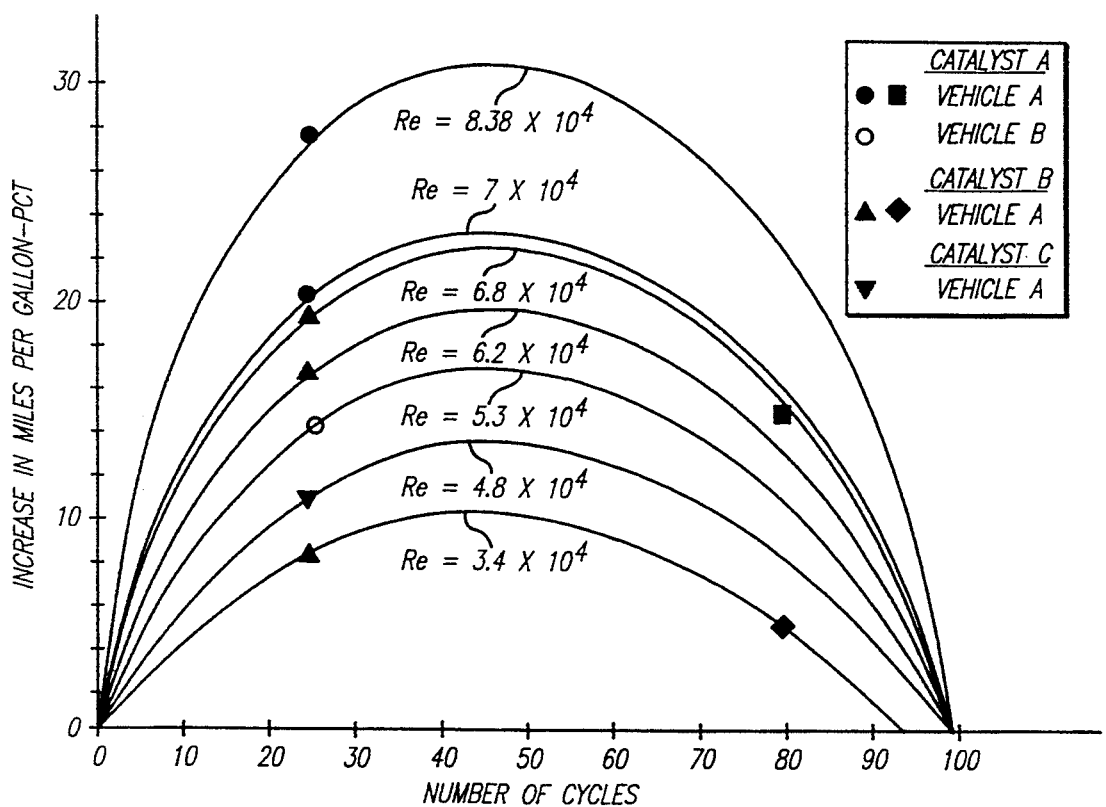
FIG. 7 shows the effects of recirculation of fuel on the increase in mileage achieved.

The data from Table 4 above has been plotted in FIG. 7 to show the effects of recirculation. From this figure, it can be seen that a maximum improvement in the reforming of the gasoline fuel occurs at about 50 cycles (recirculations) for each Reynolds Number in the effective Reynolds Number range.

The Applicants have performed much of their evaluation at 25 cycles, knowing that the quantity of fuel in the source (fuel tank) on mobile vehicles will decrease as fuel is consumed and thus move the effective number of cycles to a higher value which results in greater improvement.

FIG. 7 also depicts the end result of increasing aromatics and decreasing saturates as shown on FIGS. 4a–4c as the fuel is recirculated a higher number of times and clearly shows the practical range of use of the process for the fuels tested.

TABLE 4
REFORMED FUEL ROAD TESTS MILEAGE IMPROVEMENTS

| | CATALYST "A" | | | | | | |
|---|---|---|---|---|---|---|---|
| | VEHICLE "A" | | | | VEHICLE "B" | | |
| | Base | | | | Base | | |
| Flow rate, GPM | — | 1.5 | 1.5 | 1.8 | — | .45 | 1.6 |
| # of cycles | — | 25 | 80 | 25 | — | 26 | 25 |
| Reynolds No. × $10^4$ | — | 6.98 | 6.98 | 8.38 | — | 2.09 | 5.28 |
| Miles driven | 1500 | 279 | 273 | 273 | 213.7 | 213.7 | 213.3 |
| MPG | 19 | 22.9 | 21.23 | 24.16 | 17.63 | 19.01 | 19.75 |
| % Increase | 0 | 20 | 11.46 | 27.16 | 0 | 7.85 | 12 |

| | CATALYST "B" VEHICLE "A" | | | | CATALYST "C" VEHICLE "A" | |
|---|---|---|---|---|---|---|
| | Base | | MOD1 | MOD2 | Base | |
| Flow rate, GPM | — | 1.8 | 1.8 | 1.8 | 1.8 | — | 1.8 |
| # of cycles | — | 25 | 80 | 25 | 25 | — | 25 |
| Reynolds No. × $10^4$ | — | 3.4 | 3.4 | 6.2 | 6.6 | — | 4.76 |
| Miles driven | 1500 | 269 | 243 | 216 | 166 | 1500 | 349 |
| MPG | 19 | 20.5 | 19.75 | 22.1 | 22.61 | 19 | 21 |
| % Increase | 0 | 8 | 4.8 | 16.46 | 19 | 0 | 10.65 |

The vehicles used for the tests for gasoline engines were as follows:

| | |
|---|---|
| Vehicle A | 1988 Chevrolet S-10 Blazer 4WD 2.8 I Engine |

Concurrent with the fuel economy improvements a reduction in carbon monoxide and hydrocarbon emissions are seen using Smog Testing Equipment certified by the State of California. Those results are given in Table 5.

TABLE 5

| | TAILPIPE EMISSIONS ON VEHICLE "A" | | | | |
|---|---|---|---|---|---|
| | Base | CATALYST "A" | CATALYST "B" | | CATALYST "C" |
| Flow rate, GPM | — | 1.5 | 1.8 | 1.8 | 1.8 | 1.8 |
| # of cycles | — | 25 | 25 | 25 | 80 | 25 |
| MPG | 19 | 22.9 | 24.16 | 20.5 | 19.75 | 21 |
| % MPG INCR | 0 | 20 | 27.16 | 8 | 4.8 | 10.65 |
| ENGINE RPM | 2525 | 2560 | 2600 | 2590 | 2580 | 2699 |
| HC (PPM) | 59 | 16 | 14 | 14 | 17 | 29 |
| CO (PCT) | .08 | 0 | .01 | 0 | 0 | 0 |
| $CO_2$ (PCT) | 14.9 | 14.9 | 14 | 15.2 | 15.1 | 15.1 |
| $O_2$ (PCT) | 1.2 | 1.6 | 1.3 | 1.7 | 1.4 | 2.6 |
| ENGINE RPM | 1542 | 1673 | 1623 | 1463 | 1558 | 1540 |
| HC (PPM) | 36 | 14 | 14 | 15 | 16 | 18 |
| CO (PCT) | .14 | 0 | .01 | 0 | 0 | 0 |
| $CO_2$ (PCT) | 14.6 | 14.8 | 13.8 | 15.2 | 14.8 | 14.9 |
| $O_2$ (PCT) | 1.3 | 1.5 | 1.4 | 1.5 | 1.5 | 2.7 |
| ENGINE RPM | 1128 | 1146 | 1093 | 1187 | 1146 | 1137 |
| HC (PPM) | 43 | 12 | 15 | 16 | 17 | 18 |
| CO (PCT) | .36 | 0 | .01 | 0 | 0 | 0 |
| $CO_2$ (PCT) | 14.6 | 14.8 | 13.6 | 15.2 | 15.0 | 15.0 |
| $O_2$ (PCT) | 1.4 | 1.5 | 1.3 | 1.6 | 1.5 | 2.8 |

Currently, the State of California requires that every other year on renewal of an automobile registration the vehicle must pass a smog certification test using a four gas analyzer. The four gases required to be measured are: unburned hydrocarbons (HC), carbon monoxide (CO), carbon dioxide ($CO_2$) and oxygen ($O_2$). The two gases which are regulated are CO and HC. Table 5 gives the emission of these gases for a number of data points from Table 4 for Vehicle A at three different RPMs.

Each column is for a test point as previously described. The RPM value was obtained by placing the vehicle in "park" and setting the RPM value by varying the throttle position. At the baseline setting of 2525 RPM, the HC was 59 PPM and the CO value was 0.08%. All catalysts tested showed the emissions to be lower than for the baseline. This can be seen to be true for the other RPM groupings shown.

In the present process, in order to achieve the results shown above, fuel is drawn, by means of a pump 5 running at constant speed, from a source (vehicle fuel tank) 1 through a typical, commercially available filter 2, into an electrically isolated chamber housing 3 the metal catalyst 4, through the pump 5 and then discharged through a line 6 back into the fuel source 1. An alternate configuration would place the electrically isolated chamber and the catalyst on the discharge side of the pump or the process could occur with a chamber and catalyst on each side of the pump. Any number of arrangements can be utilized including chambers and catalysts in series or parallel on either or both sides of the pump.

The process must in any of the above configurations be sized to achieve a Reynolds Number over the catalyst of between $2 \times 10^3$ to $20 \times 10^4$ and a number of passes over the catalyst of between 1 and approximately 100. The size of the fuel source, the speed of the pump, the catalyst size and configuration, and the viscosity of the fuel all are factors which must be considered in proper use of the process to achieve the correct Reynolds Number and number of recirculations over the catalyst.

Figure 6:
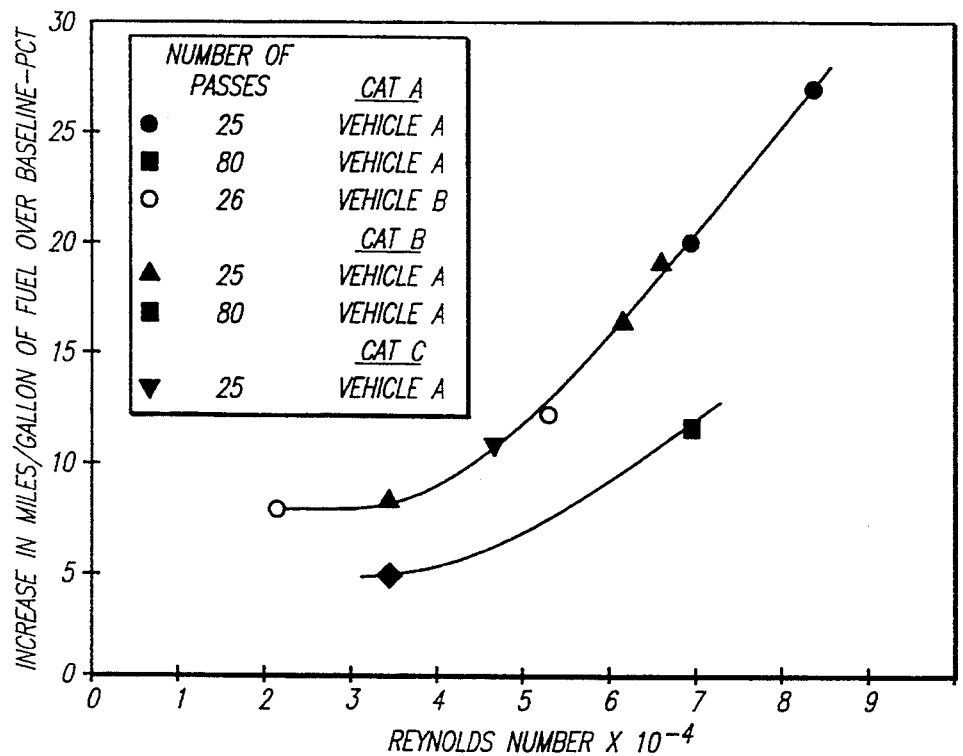
FIG. 6 shows the road test data on a vehicle equipped with a catalytic converter and a computer controlled fuel system and on a vehicle without a catalytic converter and with a carburated fuel system in accordance with the present invention.

Experience has shown that between 25 and 60 passes over a catalyst at Reynolds between 4 and $20 \times 10^4$ produce the gasoline fuel characteristics which yield the preferred results. The values will also match the requirements of most automobile fuel capacities and usage. The road test data on a vehicle equipped with a catalytic converter and a computer controlled fuel system is shown in FIG. 6. The change in fuel economy, at two values of recirculation, with Reynolds Number is given. This data is taken from Table 4. The change in economy is computed by subtracting the baseline mileage from that of the reformulated fuel test mileage and then dividing by the baseline mileage. This value is expressed as a percentage of the original baseline mileage. The Reynolds Numbers are calculated by using the procedure as given above. The road test data for an older vehicle is also shown for one value of recirculation.

FIG. 7 is a graph which shows the percentage of increase in mileage from the data presented above for gasoline fuels at the various Reynolds Numbers and cycles (recirculations) treated. As can be observed, once the number of cycles are in excess of approximately 100 cycles the improved mileage characteristics do not exist. While FIG. 7 is a graph for gasoline fuel only, the data for diesel and kerosene fuels at the Reynolds Numbers and cycles discussed above would most likely yield a similar result.

Figure 8A:
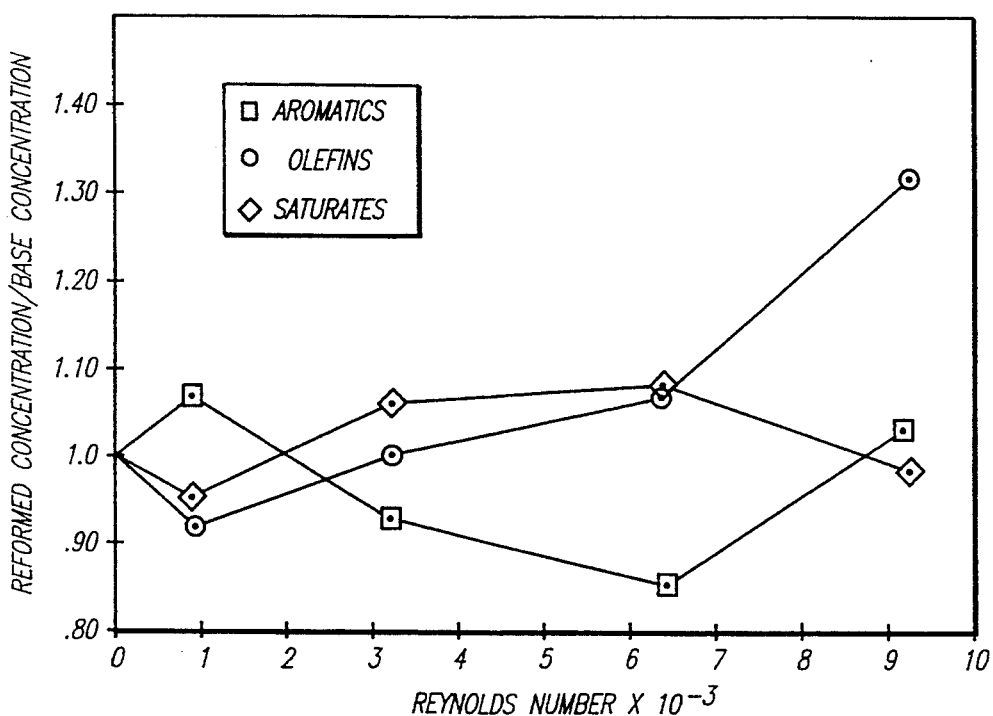
FIG. 8a is a graph which illustrates the changes to the aromatic content of Diesel fuel using the present invention with a single pass.
Figure 8B:
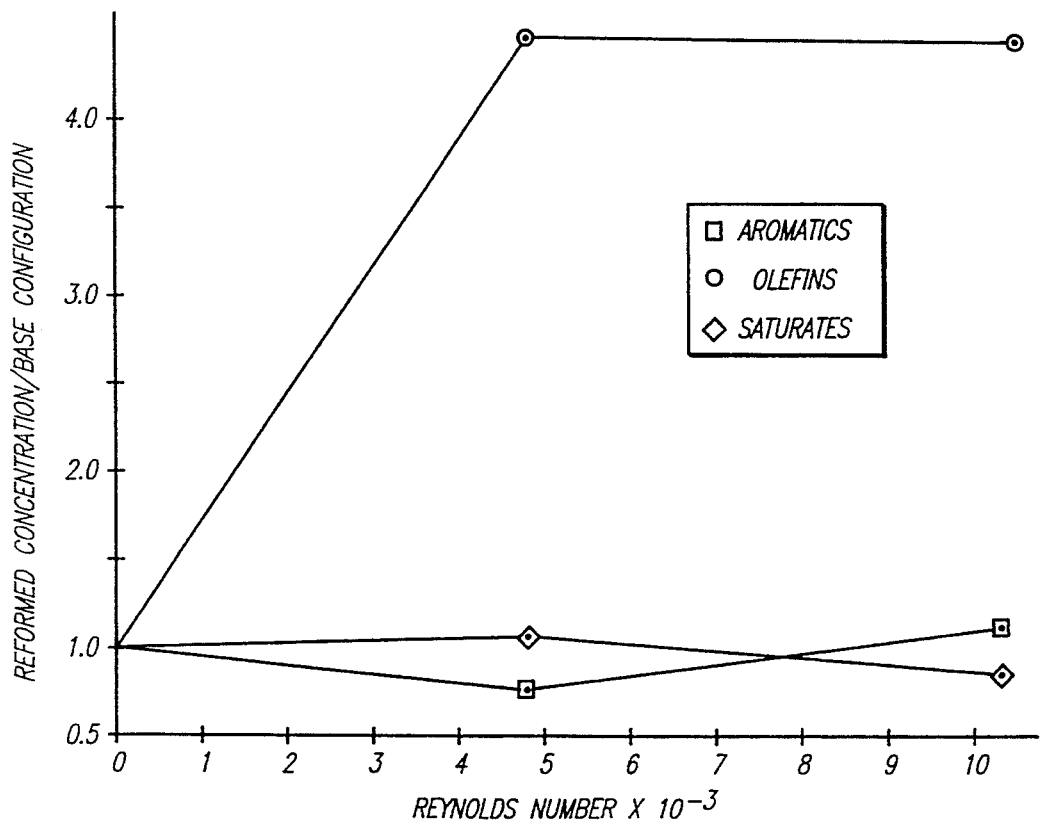
FIG. 8b is a graph which illustrates the changes to the aromatic content of Diesel fuel using the present invention with 25 passes.

Diesel fuel and kerosene behave in a similar manner as gasoline when used with the same system described above. The changes to the aromatic content occur at different flow rates than that of gasoline and at lower Reynolds Numbers. This is shown in FIGS. 8a and 8b for diesel fuel. The changes in aromatic content are very important to diesel engines in that smoke emissions are reduced by using this process as shown in Table 6 for Vehicle C. The data for Vehicles A and B were based upon actual road use while the data for Vehicle C was obtained using a dynamometer. Experience has shown that between 25 and 60 passes over a catalyst at a Reynolds Number between 2 and $7 \times 10^3$ produces the preferred results on diesel fuels.

The vehicles and engines used for the tests for diesel engines were as follows:

TABLE 6

| | Vehicle "A" | | | Vehicle "B" | | Vehicle "C" | | |
|---|---|---|---|---|---|---|---|---|
| | BASE | CATALYST | | BASE | CATALYST | BASE | CATALYST | |
| | | A | B | | B | | A | B |
| Flow rate, GPM | — | .40 | .55 | — | .66 | — | .62 | .62 |
| # of catalysts used in system | — | 2 | 1 | — | 1 | — | 1 | 1 |
| # of cycles/cat | — | 3 | 4 | — | 4.3 | — | 25 | 25 |
| # of cycles, total | — | 6 | 4 | — | 25 | — | — | — |
| Reynolds No. $\times 10^3$ | — | 2.37 | 3.64 | — | 4.38 | — | 3.68 | 4.11 |
| Miles driven | 1383 | 1624 | 545 | 1099 | 1073 | 0 | 0 | 0 |
| MPG | 4.80 | 5.06 | 5.0 | 5.27 | 5.68 | Dynamometer Testing | | |
| % MPG Increase | 0 | 5.4 | 4.2 | 0 | 7.7 | — | — | — |
| Engine Rpm @ max load | — | — | — | — | — | 1302 | 1303 | 1302 |
| Opacity % | — | — | — | — | — | 5.7 | 4.3 | 4.7 |
| % Smoke Reduction | — | — | — | — | — | — | 24.6 | 17.5 |
| Engine RPM @ near max load | — | — | — | — | — | 1402 | 1402 | 1404 |
| Opacity % | — | — | — | — | — | 3.5 | 2.7 | 2.8 |
| % Smoke Reduction | — | — | — | — | — | — | 22.8 | 20.0 |
| Engine Rpm @ | — | — | — | — | — | 1983 | 1981 | 1978 |

TABLE 6-continued

DIESEL ENGINES MILEAGE IMPROVEMENTS AND SMOKE REDUCTIONS

| | Vehicle "A" | | | Vehicle "B" | | Vehicle "C" | | |
| | | CATALYST | | | CATALYST | | CATALYST | |
| | BASE | A | B | BASE | B | BASE | A | B |
|---|---|---|---|---|---|---|---|---|
| min load Opacity % | — | — | — | — | — | 2.1 | 1.4 | 0.8 |
| % Smoke Reduction | — | — | — | — | — | — | 33.3 | 61.9 |

Vehicle A Kenworth, Caterpillar 3406B
Vehicle B Kenworth, Caterpillar 3406B
Vehicle C Kenworth, Caterpillar 3406B The fuel sources for diesel applications are usually much larger in capacity and thus require a greater volumetric pump capacity to insure the proper number of recirculations to insure optimum performance. This can be controlled by using multiple catalysts in parallel or series and a larger pump or multiple individual systems with a smaller pump and a single catalyst. The process can be designed and tailored to meet a wide range of applications, including refineries, as long as the basic principles the applicants have defined are controlled. It is believed that the results for kerosene will be very similar to that of diesel fuel because of the general similarities of the two fuels.

It will be obvious to a person of ordinary skill in the art that many changes and modifications can be made to the subject invention without departing from the spirit and scope of the present invention.

We claim:

1. A method for reforming of light hydrocarbon fuels to obtain high quality fuel at a pressure in the range of approximately 10 to 100 psia and a temperature in the range between of approximately $-50°$ and $250°$ F. comprising the steps of:
   a) drawing said light hydrocarbon fuel from a fuel source;
   b) passing said fuel into a non-electrical conducting chamber and over a metal catalyst comprising nickel and copper at a Reynolds Number greater than $2 \times 10^3$; and
   c) recirculating said fuel over said catalyst between 1 and approximately 100 cycles.

2. The method of claim 1 wherein said fuel is passed over said catalyst at a constant speed by means of a fluid pump.

3. The method of claim 2 wherein the catalyst chamber and the catalyst are located in the discharge line from the pump.

4. The method of claim 2 wherein a plurality of catalyst chambers and catalysts are used in parallel with a common pump.

5. The method of claim 2 wherein a plurality of catalyst chambers and catalysts are used in series with a common pump.

6. The method of claim 1 wherein said fuel is filtered before it is passed over said catalyst.

7. The method of claim 1 wherein said fuel is pumped from and returned to the same source.

8. The method of claim 1 wherein when said fuel is diesel fuel, said fuel is passed over said catalyst between approximately 25 and 60 passes at a Reynolds Number between approximately 2 and $7 \times 10^3$.

9. The method of claim 1 wherein when said Reynolds Number is less than approximately $20 \times 10^4$.

10. The method of claim 1 wherein when said fuel is gasoline for automobile engines, said fuel is passed over said catalyst between approximately 25 and 60 passes over a catalyst at Reynolds Number between approximately 4 and $20 \times 10^4$.

11. The method of claim 1 wherein said catalyst comprises about 45–65% copper, 2–17% tin, 0.02 to 1.4% lead, 9.85–21% zinc, 4–28% nickel, 0.1 to 0.3% iron, 0–0.076% aluminum and 0.01–9% manganese.

12. The method of claim 11 wherein said catalyst comprises about 45% copper, 17% tin, 0.03% lead, 9.85% zinc, 28% nickel, 0.2% iron, and less than 0.01% manganese.

13. A method for reforming of hydrocarbon fuels to obtain a high quality fuel at a pressure in the range of approximately 10 to 100 psia and a temperature in the range between $-50°$ and $250°$ F. comprising the steps of:
   a) drawing fuel through a filter from a storage tank containing a hydrocarbon fuel;
   b) passing said fuel into a non-electrical conducting chamber and over a dissimilar metal catalyst comprising copper and nickel at a Reynolds Number between approximately $2 \times 10^3$ and $20 \times 10^4$;
   c) drawing said fuel through a constant speed pump;
   d) discharging said fuel into at least one storage tank;
   e) repeating steps a–d on said discharged fuel of step d for between 0 and approximately 100 cycles.

* * * * *